United States Patent [19]
Harada et al.

[11] 3,914,184

[45] Oct. 21, 1975

[54] METHOD FOR CONVERTING CRYSOTILE ASBESTOS

[75] Inventors: Yoshiro Harada, Skokie; William B. Crandall, Wheaton, both of Ill.

[73] Assignee: The United States of America as represented by the Secretary of the Air Force, Washington, D.C.

[22] Filed: Oct. 17, 1973

[21] Appl. No.: 407,378

[52] U.S. Cl. ............... 252/457; 136/86 R; 136/144; 136/146; 136/148; 423/167; 423/635
[51] Int. Cl.$^2$ .......................................... B01J 29/00
[58] Field of Search ........... 136/143, 144, 146, 148, 136/86 R; 423/167, 635; 252/457

[56] References Cited
UNITED STATES PATENTS

| | | | |
|---|---|---|---|
| 442,335 | 12/1890 | Roberts | 136/148 |
| 578,073 | 3/1897 | Blumenberg | 136/148 X |
| 1,545,132 | 7/1925 | Drambour | 423/167 X |
| 3,126,302 | 3/1964 | Drushella | 136/143 X |
| 3,342,642 | 9/1967 | Barber | 136/146 X |

*Primary Examiner*—Patrick P. Garvin
*Assistant Examiner*—John F. Niebling
*Attorney, Agent, or Firm*—Joseph E. Rusz; William J. O'Brien

[57] ABSTRACT

A method for converting chrysotile asbestos to a magnesium hydroxide rich composition by subjecting the asbestos to repeated cycles of treatment with a 20 to 60 percent solution of potassium hydroxide heated to a temperature of from about 150°C to 200°C for a predetermined period of time, followed by the intermittent removal of the hot potassium hydroxide and subsequent washing of the treated asbestos between each cycle.

2 Claims, No Drawings

METHOD FOR CONVERTING CRYSOTILE ASBESTOS

BACKGROUND OF THE INVENTION

This invention relates to a method for treating chrysotile asbestos and to the product produced thereby. In a more specific aspect, this invention concerns itself with a method for developing a converted asbestos which finds utility as a fuel cell matrix for hydrogen-oxygen fuel cells.

Recent developments in space technology has created considerable interest in the utilization of fuel cells as an efficient and reliable means for providing electrical energy. The hydrogen-oxygen type fuel cell, which uses aqueous potassium hydroxide as an electrolyte, has proven to be especially useful. This type of cell uses a mat matrix for retaining the electrolyte and chrysotile asbestos fibers have been found to be most desirable for use as the mat material.

Chrysotile is a crystalline substance and the principal mineral constituent of the commercial form of asbestos. It is chemically defined by the formula $3MgO.2SiO_2.2H_2O$. and is an extremely fine, fibrous material that finds many applications because of its desirable flexibility, capillarity and fire retardant properties. Microstructural examination of asbestos using scanning electron microscopy reveals the fibrous nature of the material. Representative photographs show that fiber bundles of 1 to 4 $\mu$ diameter make up the bulk of asbestos. In higher magnification ($6000x$) very fine fabrils of less than $0.1\mu$ are evident, revealing the high surface areas which contributes to the excellent capillarity exhibited by asbestos.

The desirability of using asbestos as a matrix material for fuel cells resides in its excellent capillarity and ability to hold a considerable volume of electrolyte. The large capillarity of the asbestos prevents "blow-through" under high gas pressure conditions. However, the excellent physical properties of asbestos are offset by its susceptibility to chemical, and hence, mechanical degradation in a hot potassium hydroxide electrolyte, when the operating temperature of a fuel cell is raised to 150°C or higher to realize higher energy outputs.

With the present invention, however, it has been found that the conversion of asbestos to a $Mg(OH)_2$-rich composition yields a material that resists the degradative effects of hot potassium hydroxide and provides an excellent matrix material for fuel cells.

SUMMARY OF THE INVENTION

In accordance with the present invention, it has been found that the conversion of asbestos to a $Mg(OH)_2$ rich composition yields a material that has proven to be excellent for use as a mat material for hydrogen-oxygen fuel cells because of its excellent resistance to potassium hydroxide at temperatures in excess of 100°C. Basic studies of the KOH - asbestos reaction reveal the reaction to be as follows:

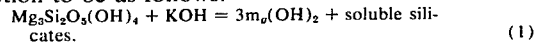
$$Mg_3Si_2O_5(OH)_4 + KOH = 3m_a(OH)_2 + \text{soluble silicates.} \quad (1)$$

The extent of the reaction is a function of time, temperature and KOH concentration. It was determined that the morphology of the $Mg(OH)_2$- asbestos reaction product can be maintained fibrous so that the desirable flexibility and capillarity for a matrix mat is retained. A highly converted material, with a composition ranging from approximately 80 to 90% $Mg(OH)_2$ with the balance asbestos, exhibits good physical properties along with greatly improved chemical resistance to KOH. Thus, the problem of KOH attack on asbestos has been solved by the conversion of asbestos in accordance with the techniques of this invention.

Briefly, that technique involves converting the asbestos by a cyclic process in which asbestos and aqueous potassium hydroxide, hereinafter referred to as reactants, are placed in a convention pressure vessel. The reactants are then heated at a temperature and for a period of time sufficient to effect the conversion of the asbestos in accordance with formula (1) referred to above. In the invention, the asbestos is subjected to a plurality of heating cycles which are interspersed with a washing treatment in hot water followed by the replenishment of the potassium hydroxide with fresh solution. The cyclic procedure of repeatedly removing asbestos from the potassium hydroxide, washing away the silicate gel with water and the subjection of the asbestos to fresh KOH accelerates the conversion process. For example, asbestos under continuous exposure to a 40% KOH solution at 150°C requires over 10,000 to attain an 88% conversion to the $Mg(OH)_2$ rich asbestos composition of this invention. With this invention, however, it has been found that subjecting asbestos to a five cycle processing technique of 20 hours per cycle in 40% KOH at 150°C interspersed with a washing treatment and replenishment with fresh KOH produces an 85% converted material that has proven to be an excellent matrix material for fuel cells.

Accordingly, the primary object of this invention is to provide an improved method for improving the chemical resistance of asbestos to hot caustic solutions while retaining its desirable morphological characteristics.

Another object of this invention is to provide a method for converting asbestos to a magnesium hydroxide rich composition.

Still another method of this invention is to provide a method for improving the capillarity of asbestos and its utilization as a matrix material for hydrogen-oxygen fuel cells.

The above and still other objects and advantages of the present invention will become more readily apparent upon consideration of the following detailed disclosure thereof.

DESCRIPTION OF THE PREFERRED EMBODIMENT

With the above-mentioned and other objects in view, the present invention contemplates a new and improved method for converting chrysotile asbestos to a magnesium hydroxide rich composition found to be especially useful as a matrix material for hydrogen-oxygen type fuel cells. The asbestos composition produced by the method of this invention is composed of from about 80 to 90 percent by weight of magnesium hydroxide with the balance substantially all asbestos.

Current fuel cell technology for various space application involves the use of hydrogen-oxygen cells which contain an aqueous potassium hydroxide electrolyte. The electrolyte is retained by an asbestos mat or matrix. A chrysotile asbestos material is generally employed as the matrix because of its large capillarity which prevents "blow-through" under high gas pressure conditions. However, the excellent physical properties of asbestos are offset by its susceptibility to chemical, and hence, mechanical degradation in hot KOH, when the operating temperature of the cell is raised to 150°C or higher.

The primary object of this invention, therefore, is to develop a method for improving the chemical resistance of asbestos to hot KOH while retaining its desirable morphological features. Although other materials, such as potassium titanate or zirconia are known to be more chemically resistant to KOH, the vastly superior structure of asbestos makes it the prime candidate for matrix materials.

In order to accomplish this object, it is first necessary to study and understand the mechanism of the KOH-asbestos corrosion reaction. The chemical reaction has been established as producing $Mg(OH)_2$ plus soluble potassium silicate, the extent of the reaction depending on environmental parameters such as KOH concentration, temperature and time.

During these basic studies, it was noted that the growth of the $Mg(OH)_2$ crystals tended to be fibrous so that a mat-making quality remained for the $Mg(OH)_2$-asbestos product. It was hypothesized that if such a desirable morphology could be maintained in a material rich in $Mg(OH)_2$, e.g., about 80 to 90% $Mg(OH)_2$- with 20 to 10% asbestos, a matrix of satisfactory chemical stability and physical properties would be obtained.

Exploitation of this corrosion characteristic is the basis for the conversion method of this invention which aimed at obtaining a highly converted (about 90%) material for use as matrix mats for fuel cells.

The basic study of the KOH-asbestos reaction involves a determination of the nature of the reaction and of the effects of various environmental parameters on the extent of reaction. The parameters examined were a potassium hydroxide concentration of from about 20 to 60 percent; a temperature range of from about 150°C to 200°C; and a reaction time of from 2 to 665 hours.

As was stated heretofore, the reaction which occurs during exposure of asbestos to hot KOH can be represented as follows:

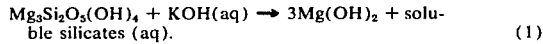
$$Mg_3Si_2O_5(OH)_4 + KOH(aq) \rightarrow 3Mg(OH)_2 + \text{soluble silicates (aq)}. \quad (1)$$

The corrosion of asbestos in hot KOH has been demonstrated to occur by the leaching of silicon from the asbestos, forming an insoluble magnesium hydroxide product and soluble potassium silicates.

Leaching of silicon from asbestos can be made to occur by a mechanism in which the fibrous morphology is retained. In the conversion process of this invention, the Si—O layers in asbestos are stripped off leaving the Mg—OH structure intact. The individual fibers in a bundle fuse together by this process, forming $Mg(OH)_2$ crystals with the morphology of the original bundles. The process of the invention involves a cyclic method for obtaining a converted material in a reasonably short processing time. For example, under a continuous exposure to 40% KOH at 150°C, over 10,000 hours would be required to attain 80% conversion. However, the cyclic procedure of this invention, which involves repeated removal of the asbestos from the hot KOH, was found to greatly accelerate the conversion process. Five cycles of 20 hours in 40% KOH at 150°C interspersed with the washing treatments produced an 85% converted material.

Studies of the effect of the reaction rate on the morphology of the converted material show the desirability of a slower reaction rate. Conditions of 150°C and a 40% KOH solution produce a relatively slow reaction rate which yields a product of the most desirable properties. More severe conversion environments involving a 60% KOH solution and/or a temperature of 200°C accelerates the reaction rate so that a less desirable fibrous morphology is obtained. However, the resultant product is still useful as a matrix material.

The basic corrosion studies of the invention show that a highly corroded product, i.e., a material with a high (90%) $Mg(OH)_2$ content, is a good mat material. In order to obtain such extended corrosion or conversion, continuous exposure in KOH would take an inordinately long time. With this invention, however, it was found that a method consisting of repeated cycles of the corrosion-filtration and washing-drying steps described above lead to a highly converted product, and thus, the cyclic process overcomes the problems associated with a continuous exposure method. The number of cycles required is a function of the timetemperature-KOH concentration parameters employed.

Debye-Scherrer powder patterns of the remaining solids after the asbestos-KOH reaction reveal chrysotile and brucite $(Mg(OH)_2)$ lines with no evidence of any other phase. The amounts of the two phases varied with the particular environmental parameters. During the evaluation of the converted product, these patterns served as a semi-quantitative measurement of the respective concentrations of the two phases through differences in the relative intensities of the major lines.

The corrosion of asbestos in hot KOH solution occurs by the leaching of Si from the asbestos, forming an insoluble magnesium hydroxide product and soluble potassium silicates. With this invention leaching of silicon from asbestos appears to occur by a mechanism in which the fibrous morphology is retained. A possible explanation is that the Si—O layers in asbestos are stripped off, leaving the Mg—OH structure intact. The individual fibers in a bundle fuse together by this process, forming $Mg(OH)_2$ crystals with the morphology of the original bundles. As a result, a highly corroded, or using another term, converted (80% to 10% asbestos) material is produced in which good capillarity is fabricated. In addition, this material exhibits significantly improved resistance to KOH attack.

A complete conversion of stoichimometric asbestos would yield $Mg(OH)_2$ amounting to 63.1% of the original weight of the asbestos. Actually, the asbestos is not perfectly stoichiometric, and impurities are present. To obtain an accurate measure of the extent of corrosion by gravimetric analysis, the actual composition of the asbestos must be known, and therefore was determined by chemical analysis.

The asbestos was analyzed by first drying it at 120°C/16 hr. to remove physically held water. The dry asbestos was found to contain 18.7% magnesium and 24.9% silicon. The stoichiometric, pure asbestos would theoretically have 20.3% magnesium and 26.3% silicon. The asbestos was also found to have the following impurities:

Al — 0.2%
Ba —0.002%
Ca — 1.0%
Cu — 0.01%
F3 — 0.1%
Mn — 0.2%
Na — 0.02%
Ni — 0.01%
Ti — 0.01%

Based on the above analysis, the weight of mg(OH)$_2$ expected upon the complete corrosion of the asbestos would be 59.7% of the original asbestos weight. This amounts to a weight loss of 40.3% from the original weight.

The weight loss value of 40.3% was used to indicate the endpoint of the reaction when monitored gravimetrically. All original asbestos weights were also based on a dry weight (after 120°C/16 hr). The percentage of asbestos converted ($C_A$) as a result of a corrosion test can be calculated from the equation:

$$(2) \quad C_A = \frac{\% \text{ wt loss}}{40.3} \cdot 100$$

The data presented herein are shown as $C_A$ and also in terms of the composition of the product, i.e., % asbestos and % Mg(OH)$_2$.

In order to determine the extent of corrosion of the asbestos as a function of its environment, a series of experiments were conducted in which KOH concentration, temperature, and time were varied. The object was to establish corrosion rate standards to which modified asbestos samples might be compared.

For the purpose of illustrating, the invention more specifically, a 40% KOH concentration was employed initially since this is similar to the strength of the electrolyte in the fuel cells of interest. Listed in Table I are the weight changes and extent of asbestos conversion at both 150° and 200°C. The results show that significant degradation (about 16%) has occurred after only 2 hours at 150°C.

showed higher extent of corrosion as seen in Table I (— 45 %). In an examination of these corroded materials, the Mg(OH)$_2$ crystals appears to have a fibrous structure similar to the original asbestos. Variations in the size of these crystals probably was determined by the size of the particular asbestos bundle precursor.

The basic corrosion studies also considered the effect of a more concentrated 60 % KOH solution. The data tabulated in Table II reveal the rapid corrosion occurring at this higher KOH concentration, especially at 200°C. A plot of the data suggests a linear relationship between reaction and log reaction time at 150°C.

SEM examination of asbestos converted in 60 % KOH revealed a more particulate as opposed to fibrous morphology. The more severe corrosion conditions of 60 % KOH lead to a less acceptable morphology in the corrosion product, and this was reflected in less desirable mat-making qualities for this material.

There appears to be a trend toward a more fibrous Mg(OH)$_2$ crystal growth with less severe reaction environments. Based on this observation, experiments were conducted using a weaker 20 % KOH solution as the corrosion medium in an effort to attain an even better fibrous quality in a corroded product. The results tabulated in Table KKK show that the extent of reaction is quite limited using 20 % KOH. The % asbestos converted after 20 hours at 200°C is about 12 %; in contrast, a conversion of about 30% can be expected after 20 hours at 150°C in 40 % KOH.

TABLE I

CORROSION WEIGHT LOSSES FOR ASBESTOS IN 40% KOH

| Example No. | Temp °C | Time Hrs | % Wt. Loss | $C_A$ | Composition, Wt. % Asbestos | Mg(OH)2 |
|---|---|---|---|---|---|---|
| 1 | 150 | 2 | 6.3 | 15.7 | 84.3 | 15.7 |
| 2 | 150 | 2 | 6.6 | 16.3 | 83.7 | 16.3 |
| 3 | 150 | 20 | 12.2 | 30.2 | 69.8 | 30.2 |
| 4 | 150 | 20 | 11.9 | 29.5 | 70.5 | 29.5 |
| 5 | 150 | 20 | 13.8 | 34.2 | 65.8 | 34.2 |
| 6 | 150 | 200 | 16.5 | 41.0 | 59.0 | 41.0 |
| 7 | 150 | 200 | 16.3 | 40.4 | 59.6 | 40.4 |
| 8 | 200 | 20 | 18.1 | 44.9 | 55.1 | 44.9 |
| 9 | 200 | 20 | 18.5 | 45.9 | 54.1 | 45.9 |
| 10 | 200 | 65 | 21.4 | 53.1 | 46.9 | 53.1 |
| 11 | 200 | 135 | 22.9 | 56.7 | 43.3 | 56.7 |
| 12 | 200 | 665 | 26.8 | 66.4 | 33.6 | 66.4 |

$C_A$ - % asbestos converted.

The kinetics and temperature dependence of the conversion process can be represented by plotting the data in Table I. The reaction appears to be a linear function of log corrosion time at both temperatures.

Scanning electron microscopy (SEM) micrographs of virgin asbestos and samples which were corroded at 150°C show substantial amounts of fibrous component remain. Some particulate material, which was identified as the brucite (Mg(OH)$_2$) phase, is also evident in all of the photographs. However, there did not appear to be any clear progressive increase in the relative amount of the non-fibrous component as the amount of brucite increased (as indicated by gravimetric analysis). SEM X-ray studies showed that the asbestos fiber bundles were Si poor, indicating partial corrosion of these structures.

The asbestos material reacted at 200°C in 40% KOH

TABLE II

CORROSION WEIGHT LOSSES FOR ASBESTOS IN 60% KOH

| Example No. | Temp °C | Time Hrs | % Wt. Loss | $C_A$** | Composition, Wt.%* Asbestos | Mg(OH)2 |
|---|---|---|---|---|---|---|
| 13 | 150 | 2 | 17.2 | 42.7 | 57.3 | 42.7 |
| 14 | 150 | 2 | 18.2 | 45.2 | 54.8 | 45.2 |
| 15 | 150 | 20 | 28.2 | 70.0 | 30.0 | 70.0 |
| 16 | 150 | 20 | 27.6 | 68.5 | 31.5 | 68.5 |
| 17 | 150 | 20 | 28.5 | 70.7 | 29.3 | 70.7 |
| 18 | 150 | 20 | 27.8 | 69.0 | 31.0 | 69.0 |
| 19 | 150 | 100 | 34.3 | 85.1 | 14.0 | 85.1 |
| 20 | 150 | 100 | 34.3 | 85.1 | 14.0 | 85.1 |
| 21 | 200 | 2 | 31.6 | 78.4 | 21.6 | 78.4 |
| 22 | 200 | 2 | 31.9 | 79.1 | 20.9 | 79.1 |
| 23 | 200 | 20 | 34.7 | 86.1 | 13.9 | 86.1 |
| 24 | 200 | 20 | 36.7 | 91.1 | 8.9 | 91.1 |
| 25 | 200 | 20 | 34.8 | 86.3 | 13.7 | 86.3 |
| 26 | 200 | 20 | 35.2 | 87.3 | 12.7 | 87.3 |

**$C_A$ - % asbestos converted.
*Per cycle

TABLE III

CORROSION WEIGHT LOSSES FOR ASBESTOS IN 20% KOH

| Example No. | Temp. °C | time Hrs | % Wt Loss | $C_A$** | Composition, Wt %* Asbestos | Mg(OH)₂ |
|---|---|---|---|---|---|---|
| 27 | 150 | 2 | 3.6 | 8.9 | 91.1 | 8.9 |
| 30 | 150 | 2 | 4.0 | 9.9 | 90.1 | 9.9 |
| 29 | 200 | 2 | 4.4 | 10.9 | 89.1 | 10.9 |
| 30 | 200 | 2 | 4.8 | 11.9 | 88.1 | 11.9 |
| 31 | 150 | 20 | 4.9 | 12.2 | 87.8 | 12.2 |
| 32 | 150 | 20 | 5.0 | 12.4 | 87.6 | 12.4 |
| 33 | 200 | 20 | 4.5 | 11.2 | 88.8 | 11.2 |
| 34 | 200 | 20 | 4.5 | 11.2 | 88.8 | 11.2 |

**$C_A$ - asbestos converted.
*Per cycle

Examination of the microstructure using the SEM showed the dominance of the fibrous asbestos phase (FIG. 12). There were indications, however, that the Mg(OH)₂ crystals were growing in a rod-like morphology, Experimentation for longer corrosion times are necessary to determine if the fibrous morphology is maintained.

The basic corrosion studies thus established the nature of the reaction and corrosion rate standards under different timetemperature-KOH concentration conditions. Importantly, the observed fibrous nature of corroded products lead to the concept of a highly converted (corroded) material as being a potential matrix, and a series of studies were made to optimize this phenomenon.

The results tabulated in Table I, II and III which deal with the continuous exposure of asbestos to KOH reveal a slowing of the reaction with time, possibly due to the formation of a silicate reaction barrier. To remove the silicate gel, it was found that a repetitive cyclic procedure involving intermittent washing with hot water heated to a temperature of about 80°C was used to corrode the asbestos. The material was subjected to a fresh KOH solution at 150°C, corroded for a period of time, and then removed and washed again with hot water to dissolve away the potassium silicate. This cycle was repeated a number of times to increase the extent of corrosion.

The cyclic procedure was found to greatly accelerate the corrosion process, supporting the view that silicate gel acts as a retardant in a continuous exposure condition. Under the moderate conditions of 150°C and 40 % for 20 hours cycles, a conversion of over 80 % is attained after 5 cycles as shown in Table IV. In contrast, under continuous exposure conditions for an equivalent 100 hours at 150°C in 40% KOH, the CA value would be only 38 %. Extrapolation of the data in Table I suggests that over 100,000 hours would be required to attain 80 % conversion under continuous exposure.

The percent weight loss based on the amount of asbestos present before each cycle is tabulated in the column "% Wt Loss; Asbestos" in Table IV. It can be seen that the extent of corrosion, i.e., % wt. loss of asbestos, decreases with higher amounts of cycles: 3rd cycle — 40.0 %, 4th cycle — 24.1 %, and 5th cycle — 14.9 %. This suggests that the increasing amounts of Mg(OH)₂ in the system might be functioning as a reaction barrier around the remaining asbestos as described heretofore.

SEM views of the material corroded for a number of 20 hour cycles in 40% KOH at 150°C show that the material appears to be quite fibrous despite the low (less than 20%) asbestos content. This morphology was evident in the processing of these samples after corrosion in that the filtered and dried mats were quite coherent and flexible.

A simple experiment performed to determine the water retentivity of the material under discussion, i.e., 80% degraded, revealed that its water-holding capacity was about 90 vol %, or equivalent to that of non-degraded asbestos. Apparently the retention of the fibrous form preserved the water-absorbing capability.

In an effort to obtain a partially converted material in a fewer number of cycles, thus shortening processing time, a 60% KOH medium was evaluated. As the data in Table V show greater than 80 % conversion was attained in only two cycles, contrasting with the five cycles required in 40 % KOH.

Examination of these materials using the scanning electron microscope (SEM) revealed morphological differences. The material converted in 60 % KOH does not show a fibrous structure for the Mg(OH)₂ does the 40 % KOH converted material. The crystals appear to be non-fibrous particulates which would not be as beneficial to the capillarity of the system.

As pointed out in an earlier section, the conversion rate using a relatively weak 20% KOH solution was extremely slow ($C_A$ = 11%) in comparison to 40 % KOH ($C_A$ = 30%) or 60 % KOH ($C_A$ = 70 %. The limited extent of reaction in 20% KOH would probably require in excess of 10 20-hour cycles to reach a high state of conversion. In contrast, this can be produced in five 20-hour cycles in 40% KOH.

TABLE IV

CORROSION BEHAVIOR OF ASBESTOS SUBJECTED TO CYCLIC CORROSION (ONE CYCLE = 150° C/40% KOH/20 HRS.)

| Cycle | Temp., °C | Time, Hrs. | Loss | $C_A$** | COMPOSITION, WT %* Asbestos | Mg(OH)₂ | % W + Loss Asbestos |
|---|---|---|---|---|---|---|---|
| 1 | 150 | 20 | 12.3 | 30.3 | 69.7 | 30.3 | 30.3 |
| 2 | 150 | 20 | 10.4 | 52.8 | 47.2 | 52.8 | 32.3 |
| 3 | 150 | 20 | 9.6 | 71.7 | 28.3 | 71.7 | 40.0 |
| 4 | 150 | 20 | 3.1 | 77.2 | 22.8 | 77.2 | 24.1 |
| 5 | 150 | 20 | 2.0 | 80.6 | 19.4 | 80.6 | 14.9 |

*Per cycle
**$C_A$ = % asbestos converted (cumulative).

TABLE V

CORROSION BEHAVIOR OF ASBESTOS

| Cycle | Temp.,°C | Time, Hrs. | % W Loss* | $C_{A**}$ | COMPOSITION, Wt% + | | % W Loss Asbestos*. |
|---|---|---|---|---|---|---|---|
| | | | | | Asbestos | Mg(OH)$_2$ | |
| 1 | 150 | 20 | 28.0 | 69.5 | 30.5 | 69.5 | 69.5 |
| 2 | 150 | 20 | 7.0 | 82.5 | 17.5 | 82.5 | 42.4 |
| 3 | 150 | 20 | 3.1 | 87.5 | 12.5 | 87.5 | 29.0 |

*Per cycle
**$C_A$ = % asbestos converted (cumulative).

From these studies, asbestos corrosion in a 40 % KOH solution at 150°C yielded a product of the most desirable morphology. The fibrous structure for Mg(OH)$_2$ was also observed for material corroded at 200°C in 40 % KOH. Therefore, the 40% KOH concentration appears to be the optimum environment for achieving a fibrous crystal growth for Mg(OH)$_2$.

In early conversion studies, it was believed that a completely converted material consisting of a single phase, Mg(OH)$_2$, would be the most stable to KOH. This would be the ideal state if the fibrous morphology could be maintained. To obtain such a material, severity of the corrosion conditions were increased by using a 60% KOH solution at 200°C. As shown in Table VI, only two cycles were required to achieve complete conversion.

Processing of this product revealed that the resulting material was somewhat powdery and was not as satisfactory for forming into a mat, indicating that the fibrous structure had been somewhat destroyed. Confirmation of this observation was provided by SEM examination in which a particulate structure was revealed. A limited amount of direction growth was observed, along with fewer asbestos fibers. Apparently these conditions were too severe to permit as desirable a growth or retention of a fibrous morphology for the Mg(OH)$_2$.

Efforts to accelerate corrosion by immersion of asbestos in molten KOH yielded an unsatisfactory material. A completely particulate system of Mg(OH)$_2$ with no mat properties was produced by this treatment.

is for the purpose of illustration only, and it is not intended to limit the scope of the invention in any way.
What is claimed is:

1. A method for effecting the conversion of chrysotile asbestos to a material having a desired compositional content of from about 80 to 90 weight percent of magnesium hydroxide with the balance substantially all asbestos which comprises subjecting said asbestos to a cyclic procedure in which each individual cycle consists essentially of the steps of:

A. forming a mixture of reactants consisting essentially of asbestos and a 20 to 60 percent aqueous solution of potassium hydroxide;

B. heating said mixture to a temperature of from about 150°C to 200°C;

C. maintaining said mixture at said temperature for a period of from about 2 to 100 hours to effect a partial conversion of said asbestos to a magnesium hydroxide containing material and the concurrent production of reaction by-products;

D. removing said potassium hydroxide solution from said mixture;

E. washing the resultant mixture with hot water for a period of time sufficient to wash away said reaction by-products; and F. repeating said individual cyclic procedure for a number of times sufficient to effect the conversion of said asbestos to said desired compositional content.

2. A. method in accordance with claim 1 wherein

TABLE VI

CORROSION BEHAVIOR OF ASBESTOS
SUBJECTED TO CYCLIC CORROSION (ONE CYCLE = 200°C/60%/6 KOH/20 HRS.)

| Cycle | Temp., °C | Time, Hrs | %wt* Loss | $C_A**$ | COMPOSITION, Wt % | | % Wt* Loss Asbestos |
|---|---|---|---|---|---|---|---|
| | | | | | Asbestos | Mg(OH)$_2$ | |
| 1 | 200 | 20 | 35.4 | 87.7 | 12.3 | 87.7 | 87.7 |
| 2 | 200 | 20 | 7.2 | 99.3 | 0.7 | 99.3 | 94.3 |

*Per cycle
**$C_A$ = % asbestos converted (cumulative)

From an examination of the results disclosed in Tables IV, V and VI, it can be seen that the cyclic process described above produces an excellent material for use as a full cell matrix in an unexpectedly short period of time. The resultant product has excellent mat-like properties, very good capillarity and is especially resistant to the degradative effects of hot potassium hydroxide.

The invention has been described with reference to specific embodiments thereof. It is to be understood, however, that the description of the present invention said asbestos is subjected to five cycles in which each cycle comprises treating the asbestos with a 40 percent aqueous solution of potassium hydroxide heated to a temperature of 150°C for a period of 20 hours and each cycle is interspersed with the removal of said potassium hydroxide and subsequent washing of the treated asbestos with water heated to a temperature of about 80°C in order to effect the conversion of said asbestos to a compositional content of from about 85 weight percent magnesium hydroxide with the balance substantially all asbestos.

* * * * *